(12) United States Patent
Samie et al.

(10) Patent No.: US 8,936,141 B2
(45) Date of Patent: *Jan. 20, 2015

(54) MICRO-ELECTRO-MECHANICAL-SYSTEMS BASED HYDRAULIC CONTROL FOR A POWERTRAIN

(75) Inventors: Farzad Samie, Franklin, MI (US); Chi-Kuan Kao, Troy, MI (US); Kumaraswamy V. Hebbale, Troy, MI (US); Chunhao J. Lee, Troy, MI (US); Dongxu Li, Warren, MI (US); Andrew L. Bartos, Clarkston, MI (US); Kevin B. Rober, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 379 days.

This patent is subject to a terminal disclaimer.

(21) Appl. No.: 13/114,472

(22) Filed: May 24, 2011

(65) Prior Publication Data
US 2012/0090937 A1  Apr. 19, 2012

Related U.S. Application Data

(60) Provisional application No. 61/393,376, filed on Oct. 15, 2010.

(51) Int. Cl.
| | | |
|---|---|---|
| *F16H 45/02* | (2006.01) | |
| *G05D 16/00* | (2006.01) | |
| *F16H 61/02* | (2006.01) | |
| *F16H 61/662* | (2006.01) | |
| *F16H 61/00* | (2006.01) | |

(52) U.S. Cl.
CPC ...... *F16H 61/0251* (2013.01); *F16H 61/66259* (2013.01); *F16H 61/0003* (2013.01)

USPC ....... 192/3.29; 192/3.3; 192/3.58; 192/85.63; 74/730.1

(58) Field of Classification Search
CPC ......... F16D 25/14; F16D 48/04; F16D 25/08; F16D 48/06; F16D 48/064; F16H 61/02; F16K 31/008; F16K 31/007; F16K 99/0001; F16K 99/0036; F16K 99/0038; F16K 99/0042; F16K 99/0044
USPC .............. 74/730.1; 192/3.29, 3.3, 3.58, 85.63
See application file for complete search history.

(56) References Cited

U.S. PATENT DOCUMENTS

| | | | |
|---|---|---|---|
| 6,494,804 B1 | 12/2002 | Hunnicutt et al. | |
| 6,540,203 B1 | 4/2003 | Hunnicutt | |
| 6,755,761 B2 | 6/2004 | Hunnicutt et al. | |
| 2006/0184304 A1* | 8/2006 | Katou et al. ................... 701/54 |

(Continued)

FOREIGN PATENT DOCUMENTS

WO   WO2008/076388   *   6/2008

*Primary Examiner* — Edwin A Young
*Assistant Examiner* — Colby M Hansen
(74) *Attorney, Agent, or Firm* — Quinn Law Group, PLLC

(57) ABSTRACT

A continuously variable transmission (CVT) for a vehicle includes a hydraulically-controlled component and a pilot valve. The pilot valve includes at least one micro-electrical-mechanical-systems (MEMS) based device. The pilot valve is operably connected to and is configured for actuating the hydraulically-controlled component. The pilot valve additionally includes a regulating valve operably connected to the pilot valve and to the hydraulically-controlled component. The regulating valve is configured to direct fluid to the hydraulically-controlled component when actuated by the pilot valve.

19 Claims, 4 Drawing Sheets

(56) References Cited

U.S. PATENT DOCUMENTS

| | | | |
|---|---|---|---|
| 2008/0047622 A1* | 2/2008 | Fuller et al. | 137/625.18 |
| 2008/0076632 A1 | 3/2008 | Watanabe et al. | |
| 2010/0019177 A1* | 1/2010 | Luckevich | 251/26 |
| 2012/0090416 A1* | 4/2012 | Kao et al. | 74/333 |
| 2012/0090426 A1* | 4/2012 | Lee et al. | 74/665 A |
| 2012/0090427 A1* | 4/2012 | Lee et al. | 74/665 A |
| 2012/0090703 A1* | 4/2012 | Li et al. | 137/487.5 |
| 2012/0090935 A1* | 4/2012 | Samie et al. | 192/3.28 |
| 2012/0090940 A1* | 4/2012 | Hebbale et al. | 192/48.601 |
| 2012/0090944 A1* | 4/2012 | Li et al. | 192/85.01 |
| 2012/0090945 A1* | 4/2012 | Lee et al. | 192/85.63 |
| 2012/0090946 A1* | 4/2012 | Lee et al. | 192/85.63 |
| 2012/0090947 A1* | 4/2012 | Lee et al. | 192/85.63 |
| 2012/0090948 A1* | 4/2012 | Lee et al. | 192/85.63 |
| 2012/0090952 A1* | 4/2012 | Lee et al. | 192/41 R |

* cited by examiner

MICRO-ELECTRO-MECHANICAL-SYSTEMS BASED HYDRAULIC CONTROL FOR A POWERTRAIN

CROSS-REFERENCE TO RELATED APPLICATION(S)

This application claims the benefit of U.S. Provisional Application Ser. No. 61/393,376 filed Oct. 15, 2010, the entire contents of which is hereby incorporated by reference.

TECHNICAL FIELD

This disclosure relates to a micro-electro-mechanical-systems (MEMS) based hydraulic control for a vehicle powertrain, and the hydraulically-actuated components therein.

BACKGROUND

Vehicles employ various power-sources for propulsion. Such power-sources may include an internal combustion engine and/or one or more electric motors or a fuel-cell. Torque from such power-sources is typically channeled to the vehicle's driven wheels via a transmission. Together, the engine, with or without the electric motor(s), the transmission, and additional subsystems, such as couplings and shafts with rotating and/or pivoting joints, typically define the subject vehicle's powertrain.

Transmissions and other powertrain subsystems frequently employ hydraulically-actuated components. Fluid valves are typically used to route pressurized fluid for actuating such hydraulically-actuated components, and to regulate operation of the powertrain.

SUMMARY

A continuously variable transmission (CVT) for a vehicle includes a hydraulically-controlled component and a pilot valve. The pilot valve includes at least one micro-electrical-mechanical-systems (MEMS) based device. The pilot valve is operably connected to and is configured for actuating the hydraulically-controlled component. The pilot valve additionally includes a regulating valve operably connected to the pilot valve and to the hydraulically-controlled component. The regulating valve is configured to direct fluid to the hydraulically-controlled component when actuated by the pilot valve.

The MEMS-based device of the pilot valve may include a MEMS-based pressure differential actuator valve. The pilot valve may further include a MEMS-based regulating valve. The regulating valve may include a MEMS-based device. The MEMS-based device of the pilot valve may include a MEMS-based pressure differential actuator valve. The MEMS-based device of the regulating valve may include a MEMS-based regulating valve. The regulating valve may also include a spool valve.

The CVT may also include a valve body. In such a case, the hydraulically-controlled component may include at least one of a line pressure control valve disposed within the valve body, a valve device disposed within the valve body, a torque transmitting mechanism, and an on/off solenoid.

The CVT may additionally include a torque converter. In such a case, the hydraulically-controlled component may include a lock-up clutch operatively connected to the torque converter. The lock-up clutch is configured for locking the torque converter and generating a mechanical connection between an engine and the CVT when the CVT is installed in the vehicle.

The CVT may furthermore include a pressure sensor operably disposed between the pilot valve and the hydraulically-controlled component. The pressure sensor may be operably disposed between the regulating valve and the hydraulically-controlled component. The pressure sensor may include a MEMS-based pressure transducer.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
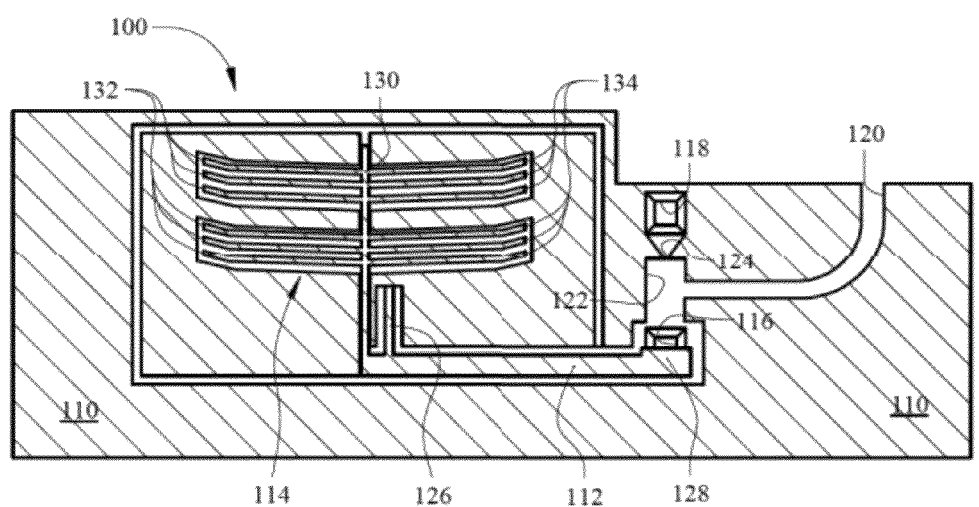
FIG. 1 is a schematic cross-sectional view of a Micro-Electro-Mechanical-Systems (MEMS) microvalve actuator.

Referring to the drawings, wherein like reference numbers correspond to like or similar components throughout the several figures, there is shown in FIG. 1 a schematic cross-sectional view of a Micro-Electro-Mechanical-Systems (MEMS) microvalve actuator 100. As discussed herein, the MEMS microvalve 100 may be used to effect hydraulic control over one or more hydraulic components, especially within a transmission. The MEMS microvalve 100 shown is only one type of MEMS device that may be used as a control valve or control actuator for the hydraulic components, and others, discussed herein.

While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

Generally, MEMS may be considered a class of systems that are physically small, having features with sizes in the micrometer range. MEMS systems may have both electrical and mechanical components. MEMS devices are produced through micromachining processes. The term "micromachining" generally refers to the production of three-dimensional structures and moving parts through processes including modified integrated circuit (computer chip) fabrication techniques (such as chemical etching) and materials (such as silicon semiconductor material). The term "microvalve" as used herein generally refers to a valve having features with sizes in the micrometer range, and thus by definition is at least partially formed by micromachining. The term "microvalve device" as used in this application means a device that includes a microvalve, and that may include other components. MEMS devices may be operating in conjunction with other MEMS (micromachined) devices or components or may be used with standard sized (larger) components, such as those produced by mechanical machining processes.

The MEMS microvalve 100 includes a housing or body 110. The MEMS microvalve 100 may be formed from several layers of material, such as semi-conductor wafers. The body 110 may also be formed from multiple layers. For example, and without limitation, the cross-sectioned portions shown may be taken through a middle layer of the MEMS microvalve 100, with two other layers existing, one behind and one in front of (relative to the view in FIG. 1) the middle layer. The other layers of the body 110 may include solid covers, port plates, or electrical control plates. However each of the layers is generally considered part of the body 110, except where separately identified.

The MEMS microvalve 100 includes a beam 112 actuated by a valve actuator 114. Selective control of the actuator 114 causes the beam 112 to selectively alter the flow of fluid between an inlet port 116 and an outlet port 118. By varying the fluid flow between the inlet port 116 and the outlet port 118, the MEMS microvalve 100 varies the pressure in a pilot port 120. As described herein, the pilot port 120 may be connected to additional valves or devices and in order to effect hydraulic control thereof through a pilot signal which varies based upon the pressure in the pilot port 120.

The inlet port 116 is connected to a source of high-pressure fluid such as a pump (not shown). The outlet port 118 is connected to a low-pressure reservoir or fluid return (not shown). For purposes of the description herein, the outlet port 118 may be considered to be at ambient pressure, and acts as a ground or zero state in the MEMS microvalve 100.

The beam 112 moves in a continuously variable manner between a first position, illustrated in FIG. 1, a second position (not shown), and myriad intermediate positions. In the first position, the beam 112 does not completely block the inlet port 116. However, in the second position, the beam 112 blocks the inlet port 116 to prevent substantially all flow from the high-pressure fluid source.

A first chamber 122 is in fluid communication with both the inlet port 116 and the outlet port 118. However, communication between the outlet port 118 and the first chamber 122 (and also the inlet port 116) is restricted by an outlet orifice 124. High volume or fast fluid flow through the outlet orifice 124 causes a pressure differential to build between the first chamber 122 and the outlet port 118.

The beam 112 is pivotally mounted to a fixed portion of the body 110 by a flexure pivot 126. The opposite portion of the beam 112 from the flexure pivot 126 is a movable end 128, which moves up and down (as viewed in FIG. 1) to selectively, and variably, cover and uncover the inlet port 116.

When the beam 112 is in the second position, it allows little or no flow from the inlet port 116 to the first chamber 122. Any pressurized fluid in the first chamber 122 bleeds off through the outlet orifice 124 to the outlet port 118. As the beam 112 of the MEMS microvalve 100 is moved toward the first (open) position, the inlet port 116 is progressively uncovered, allowing faster flows of fluid from the inlet port 116 into the first chamber 122. The fast-flowing fluid cannot all be drained through the outlet orifice 124 and causes a pressure differential to form as the fluid flows through the outlet orifice 124, raising pressure in the first chamber 122.

As the inlet port 116 is further opened to the first position (as shown in FIG. 1), fluid gradually flows faster through the outlet orifice 124, causing a larger pressure differential and further raising the pressure in the first chamber 122. When the beam 112 is in the first position, it allows high flow from the inlet port 116 to the first chamber 122. Therefore, the pressure in the first chamber 122 can be controlled by controlling the rate of flow from the inlet port 116 through the first chamber 122 and the outlet orifice 124 to the outlet port 118. The position of the beam 112 controls the rate of flow of the fluid from the inlet port 116, and thus the pressure in the first chamber 122.

The valve actuator 114 selectively positions the beam 112. The actuator 114 includes an elongated spine 130 attached to the beam 112. The actuator 114 further includes a plurality of first ribs 132 and a plurality of second ribs 134, which are generally located on opposing sides of the elongated spine 130. Each of the first ribs 134 has a first end attached to a first side of the elongated spine 130 and a second end attached to the body 110. Similar to the first ribs 132, each of the second ribs 134 has a first end attached to the elongated spine 130 and a second end attached to the fixed portion of the body 110.

The elongated spine 130 and the first ribs 132 and the second ribs 134 may appear illustrated in FIG. 1 as disconnected from the body 110. However, the elongated spine 130, the first ribs 132, and the second ribs 134 are all formed from the same material and each is connected to the body 110 at some point in order to allow relative movement. The connection of the elongated spine, as well as the first and second ribs 132, 134, may be below the cross-sectioned plane shown in FIG. 1. Generally, the elongated spine 130, the first ribs 132, and the second ribs 134 may be considered the moving portions of the actuator 114.

The first ribs 132 and the second ribs 134 are configured to thermally expand (elongate) and contract (shrink) in response to temperature changes within the first ribs 132 and the second ribs 134. Electrical contacts (not shown) are adapted for connection to a source of electrical power to supply electrical current that acts to thermally expand the first ribs 132 and the second ribs 134 when the current flows through the first and second ribs 132, 134.

The actuator 114 is adapted to be controlled by an electronic control unit (ECU) or other programmable device (not shown) which regulates or varies the supply of current to the first ribs 132 and the second ribs 134. As the first ribs 132 and the second ribs 134 expand due to sufficient current flow, the elongated spine 130 moves or stretches downward (as viewed in FIG. 1), causing the beam 112 to rotate in the generally counter-clockwise direction. The resulting rotation of the beam 112 causes the moveable end 128 to move upward (as viewed in FIG. 1) and progressively block a larger area of the inlet port 116.

Progressively blocking the inlet port 116 allows less (and eventually no) fluid to flow into the first chamber 122, decreasing the pressure therein as the fluid drains to the outlet port 118. Once the inlet port 116 is closed, the MEMS microvalve 100 is in the second position (not shown), and no pilot signal is being communicated through the pilot port 120.

As the flow of current drops, the first ribs 132 and the second ribs 134 contract and the elongated spine 130 moves upward (as viewed in FIG. 1), causing the beam 112 to rotate in the generally clockwise direction. The resulting rotation of the beam 112 causes the moveable end 128 to move downward (as viewed in FIG. 1) and progressively uncover a larger area of the inlet port 116.

Progressively uncovering a larger area of the inlet port 116 allows more fluid to flow into the first chamber 122, increasing the pressure therein as the fluid flow overcomes the ability of the outlet port 118 to drain fluid from the first chamber 122. Once the inlet port 116 is substantially open, the MEMS microvalve 100 is in the first position (shown in FIG. 1), and a strong pilot signal is being communicated through the pilot port 120.

In addition to the heat-actuated MEMS device shown in FIG. 1, other types of MEMS based actuators may be used in place of the MEMS microvalve 100 or in place of the actuator 114. In general, the micro-electrical-mechanical-system (MEMS) based device may include any device that has one or more electronic elements fabricated through an integrated circuit technique (e.g., etching on a silicon wafer) and one or more mechanical elements fabricated through a micromachining process (e.g., forming structures and moving parts with dimensions in the micrometer range). The electronic and mechanical elements may also be formed by other processes. In alternative or additional approaches, configurations, or embodiments, the MEMS-based device may include other elements with dimensions in the micrometer range, such as an electromagnetic field actuator, a piezoelectric amplifier, a thermal actuator, a pressure sensor, a gyroscope, an optical switch, other MEMS-based devices, or any combination thereof.

Figure 2:
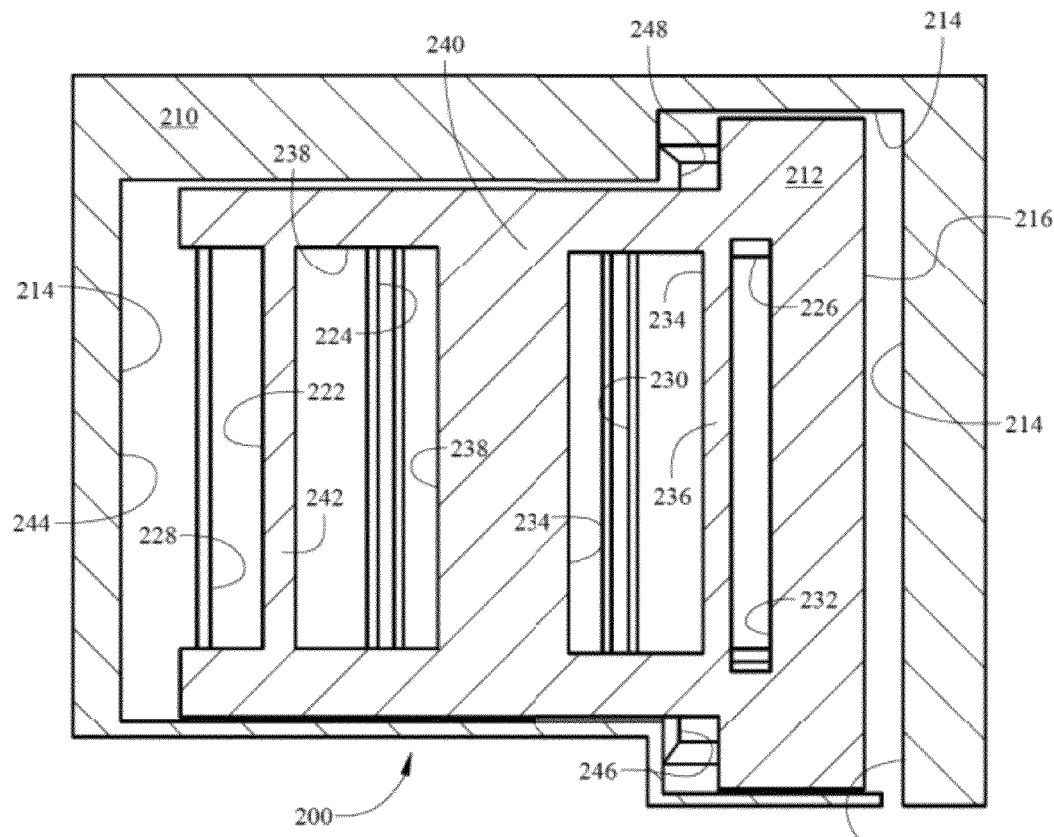
FIG. 2 is a schematic cross-sectional view of a MEMS spool valve which may be used alone or in conjunction with the MEMS microvalve actuator shown in FIG. 1.

Referring now to FIG. 2, and with continued reference to FIG. 1, there is shown a schematic cross-sectional view of a MEMS-based spool valve 200. The MEMS-based spool valve 200 includes a housing or body 210. The MEMS-based spool valve 200 may be formed from several layers of material, such as semi-conductor wafers. The body 210 may also be formed from multiple layers. For example, and without limitation, the cross-sectioned portions shown may be taken through a middle layer of the MEMS-based spool valve 200, with two other layers existing, one behind and one in front of (relative to the view in FIG. 2) the middle layer.

The MEMS-based spool valve 200 includes a slider 212 configured to be movable to the left and to the right (as viewed in FIG. 2) within a cavity 214 defined by the body 210. The slider 212 is actuated by fluid pressure on a piloted surface 216, which is in fluid communication with a piloted chamber 220 of the cavity 214. Selective variation of pressure within the piloted chamber 220 alters the force applied to the piloted surface 216. The piloted chamber 220 may be in fluid communication with a pilot signal, such as the pilot signal produced by the pilot port 120 of the MEMS microvalve 100 shown in FIG. 1.

The slider 212 is formed with an elongated plate having a pair of oppositely disposed arms extending perpendicularly at a first end of the body so that the slider 212 is generally a T-shape, having the piloted surface 216 at a wider longitudinal end of the slider 212, and a counter surface 222 at a relatively narrower opposing longitudinal end of the slider 212. The cavity 214 is also generally a T-shape to accommodate the movement of the slider 212.

The body 210 defines a number of ports connecting with the cavity 214, some of which may be formed in cross-sectioned layers and some of which may be formed in other layers. The ports include a supply port 224, which is adapted to be connected to a source of high pressure fluid, such as a transmission pump (not shown). The supply port 224 may be connected to the same source of high-pressure fluid as the inlet port 116 of the MEMS microvalve 100 shown in FIG. 1. The body 210 also defines a tank port 226, which is connected to a low-pressure reservoir or fluid return (not shown). The tank port 226 may be connected to the same source of low-pressure fluid as the outlet port 118 of the MEMS microvalve 100 shown in FIG. 1.

A first load port 228 and a second load port 230 are formed in the body and communicate with the cavity 214. The first load port 228 and the second load port 230 are disposed on opposite sides of the supply port 224. The first load port 228 and the second load port 230 are adapted to be connected together to supply pressurized fluid to a hydraulically-operated component of the transmission or powertrain, as described herein. Additional ports, channels, or troughs (not viewable in FIG. 2) may be formed on the upper surface of the cavity 214 opposite the first load port 228 and the tank port 226. The additional troughs help balance flow forces acting on the slider 212.

The slider 212 shown includes three openings therethrough. A first opening 232, close to the piloted surface 216, is defined through the slider 212 to permit the fluid volume to equalize through the trough above the tank port 226 with the pressure at the tank port 226, balancing forces acting vertically (into and out of the view shown in FIG. 2) on the slider 212. A second opening 234 through the slider 212 forms an internal volume that is always in communication with the second load port 230.

A web 236 between the second opening 234 and the first opening 232 permits or prevents flow between the second load port 230 and the tank port 226 depending upon the position of the slider 212. In the illustrated position, the web 236 prevents flow between the second load port 230 and the tank port 226. When the web 236 moves to the right (as viewed in FIG. 2), a fluid pathway between the second load port 230 and the tank port 226 is opened, venting any pressure present at the second load port 230 to the low pressure reservoir connected to the tank port 226.

A third opening 238 through the slider 212 permits the fluid volume in the trough above the first load port 228 to equalize with the pressure at the first load port 228, balancing forces acting vertically (into and out of the view shown in FIG. 2) on the slider 212. A web 240 between the second opening 234 and the third opening 238 prevents flow between the supply port 224 and the second load port 230 in all positions of the slider 212.

A web 242 between the third opening 238 and the counter surface 222 permits or prevents flow between the supply port 224 and the first load port 228, depending upon the position of the slider 212. In the illustrated position, the web 242 prevents flow between the supply port 224 and the first load port 228. When the slider 212 moves to the left (as viewed in FIG. 2), a fluid pathway opens between the supply port 224 and the first load port 228, supplying pressurized fluid to the load connected to the first load port 228.

The slider 212 cooperates with the walls of the cavity 214 to define the piloted chamber 220 between the piloted surface 216 and the opposing wall of the cavity 214. A counter chamber 244 is defined between the counter surface 222 and the opposing wall of the cavity 214. The counter chamber 244 is in fluid communication with the first load port 228 at all times. Additionally, two volumes 246 and 248 may be defined between respective pairs of shoulders of the T-shaped plate forming the slider 212 and the shoulders of the T-shaped cavity 214. The volumes 246 and 248 are in communication with the tank port 226 at all times in order to prevent a hydraulic lock of the slider 212.

The total area of the piloted surface 216 of the slider 212 is larger than the total area of the counter surface 222 of the slider 212. Therefore, when the pressures in the piloted chamber 220 and the counter chamber 244 are equal, the resultant unbalanced net force acting on the slider 212 will urge the slider 212 to the left (as viewed in FIG. 2).

Figure 3:
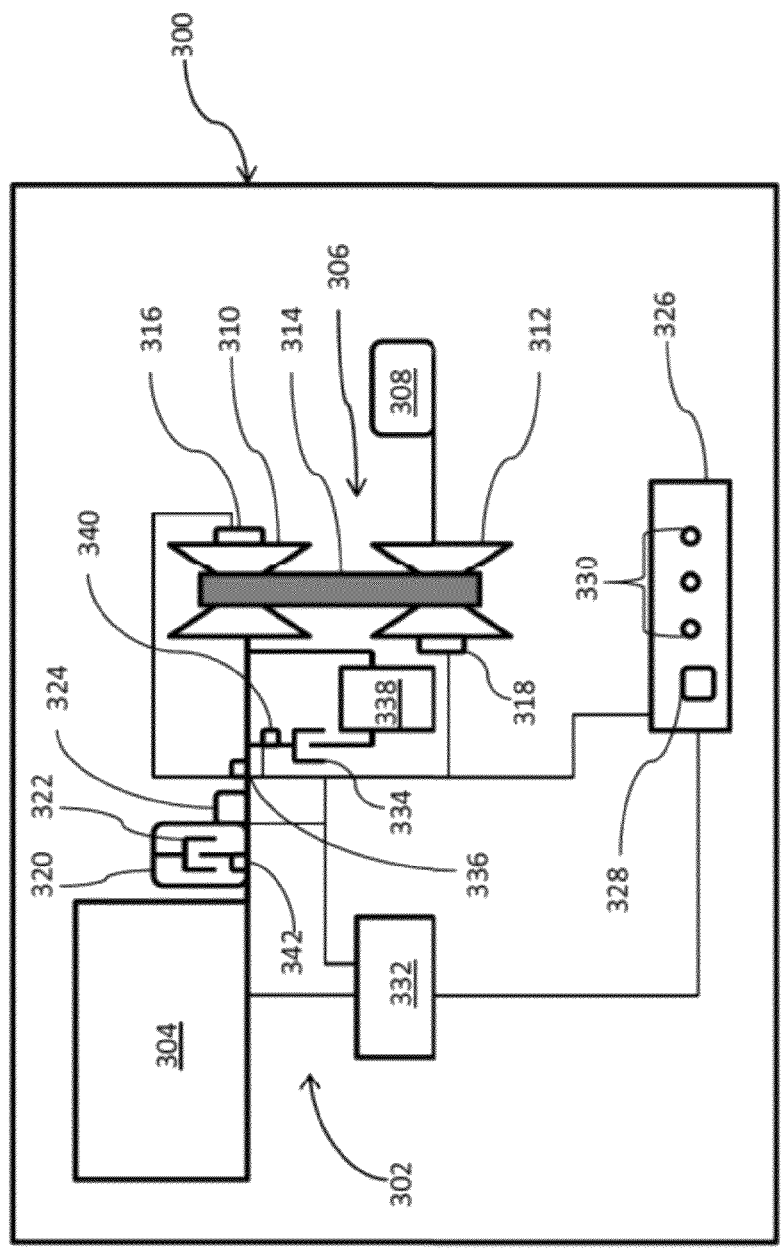
FIG. 3 is a schematic diagram of a powertrain into which a pressure control system may be incorporated.

Referring to FIG. 3, a vehicle is shown schematically at 300. The vehicle 300 includes a powertrain 302. The powertrain 302 includes an engine 304, a continuously variable transmission (CVT) 306, and a differential 308. The engine 304 is configured for producing torque to power the vehicle 300. The engine 304 may include, but is not limited to, an internal combustion engine.

The CVT 306 is a torque transmitting apparatus which can change steplessly through an infinite number of effective gear ratios between predetermined maximum and minimum values. This contrasts with other mechanical transmissions that allow a selection of only a preset number of distinct gear ratio steps. The CVT 306 also covers the operation and structure of an infinitely variable transmission (IVT). As is known by those skilled in the art, the IVT is a specific type of a CVT in which the range of ratios of output shaft speed to input shaft speed includes a zero ratio that can be continuously approached from a defined "higher" ratio.

The CVT 306 depicted in FIG. 3 is a variable-diameter pulley or Reeves drive. In such a CVT there are two V-belt pulleys 310 and 312. Each of the pulleys 310 and 312 are split perpendicular to their axes of rotation, with a V-belt 314 running between them and providing a mechanical connection between the engine 304 and the differential 308. The gear ratio is changed by simultaneously moving two sections of one of the two pulleys 310, 312 closer together and two sections of the other of the two pulleys farther apart. A hydraulic force is employed to control the movement of the two sections of each of the pulleys 310, 312 to thus change the effective gear ratio of the CVT 306. The force for controlling the movement of the pulley 310 is provided via a hydraulic actuator 316, while the force for controlling the movement of the pulley 312 is provided via a hydraulic actuator 318.

As shown in FIG. 3, the CVT 306 includes a torque converter 320 for transmitting torque of the engine 304 to the CVT. The torque converter 320 includes an internal lock-up clutch 322 for generating on demand a mechanical connection between the engine 304 and the CVT 306. The actuation of the lock-up clutch 322 is controlled by a pressurized fluid that is received from a hydraulic pump 324 operated by the engine 304. The torque from the engine 304 is channeled to the torque converter 320 and then to the CVT 306. The differential 308 receives the torque from the CVT 306 and directs it to at least one drive wheel (not shown) of the vehicle 300. The operation of the torque converter 320 and the changes of the gear ratios in the CVT 306 are typically controlled by a valve body 326. The valve body 326 operates as a hydraulic control center that receives pressurized fluid from the fluid pump 324 operated by the engine 304.

The fluid pressure coming from the hydraulic pump 324 is regulated by a line pressure control valve 328 within the valve body 326. The line pressure control valve 328 controls and/or directs a supply of pressurized fluid from the hydraulic pump 324 to one or more hydraulic components of the CVT 306. Accordingly, the line pressure control valve 328 is in fluid communication with the hydraulic pump 324, and also with one or more of the hydraulic components of the CVT 306. Thus controlled, the fluid pressure is then used to run a network of valve devices 330 located inside the valve body 326, such as spring-loaded valves, check balls, and/or servo pistons. The valve devices 330 are controlled by a controller 332, such as an electronic control unit (ECU) or a separate transmission control unit (TCU) to effect gear ratio changes inside the CVT 306. The hydraulic pressure regulated by the valve devices 330 is used to actuate a torque transmitting mechanism 334, such as a clutch or a brake band actuator, and a gear ratio control valve 336. The torque transmitting mechanism 334 engages an epicyclic planetary gear set 338 to effect either a forward or reverse drive, while the gear ratio control valve 336 regulates the fluid pressure applied to the hydraulic actuators 316 and 318. Accordingly, the actuation of the torque transmitting mechanism 334 and the gear ratio control valve 336 controls the selection of an appropriate gear ratio of the CVT 306 in the forward or reverse drive.

The line pressure control valve 328 may regulate pressure and/or flow to the various different hydraulic components of the CVT 306. For example, the line pressure control valve 328 may increase or decrease fluid pressure to the torque transmitting mechanism 334. The lock-up clutch 322 inside the torque converter 320 is controlled by the pressurized fluid received from the hydraulic pump 324 and regulated by the line pressure control valve 328.

The torque transmitting mechanism 334 is actuated by a hydraulic piston (not shown). Accordingly, the torque transmitting mechanism 334 is a hydraulic component of the CVT 306. Upon receiving a hydraulic signal, a hydraulic piston of the torque transmitting mechanism 334 engages the subject torque transmitting mechanism.

The CVT 306 may further include one or more on/off solenoids. The on/off solenoids are hydraulically actuated devices that control and/or actuate another device. The on/off solenoid is actuated by a hydraulic signal, and is therefore a hydraulic component of the CVT 306. For example, the CVT 306 may include an on/off solenoid 340 coupled to the torque transmitting mechanism 334 to control actuation of the hydraulic servo piston of the subject torque transmitting mechanism. The CVT 306 may also include an on/off solenoid 342 coupled to the lock-up clutch 322 to control actuation of the hydraulic servo piston of the torque converter clutch. It should be appreciated that the on/off solenoid may also be operably connected to some other component of the CVT 306.

The CVT 306 depicted in FIG. 3 is intended to only provide an example of an appropriate CVT, and is not limited to the configuration shown. Although not shown, it will be appreciated by those skilled in the art that the powertrain 302 may similarly include a different variation of the CVT 306. Another well-known type of a CVT is toroidal or roller-based. The toroidal CVT is made up of two discs and two near-conical rollers that transmit power between the discs. One disc functions as the input, while the other functions as the output. Power is transferred from one disc to the other by the rollers. The disc can be moved along the axis of the rollers, changing angle as needed to maintain contact at varying and distinct diameters in order to generate an effective gear ratio. Typically, a hydraulic actuator, functionally like actuators 316 and 318 of the CVT 306, uses a pressurized fluid received from the hydraulic pump 324 to control the movement of the roller and change the gear ratio in the toroidal CVT. A toroidal CVT may either be partial or full toroidal. Although full toroidal CVTs are generally used without a torque converter, partial toroidal systems may require the use of torque converter 320 for proper operation. The partial toroidal systems may additionally employ the lock-up clutch 322, as with the CVT 306.

When used in a vehicle behind the engine 304, the CVT 306, or another CVT like the partial or full toroidal system described above, allows the engine to maintain a constant angular velocity over a range of the CVT's output speeds. Such capability can provide improved operating efficiency of the vehicle 300 as compared with a stepped gear ratio transmission by enabling the engine 304 to run at its most efficient revolutions per minute (RPM) for a range of vehicle speeds. Alternatively, such capability may be used to maximize the performance of the vehicle 300 by allowing the engine 304 to turn at the RPM at which it produces peak power.

Referring now to FIGS. 4-8, and with continued reference to FIGS. 1-3, there are shown multiple schematic box diagrams of pressure control systems for hydraulic components within a transmission, such as the powertrain 302 shown in FIG. 3. Each of the plurality of options for pressure control system shown and described may be used for operation and control of any of the plurality of components of the CVT 306.

Specifically, the hydraulically-controlled component 410 may include but is not limited to the lock-up clutch 322, the line pressure control valve 328, the valve devices 330, the torque transmitting mechanism 334, and the on/off solenoids 340, 342, shown in FIG. 3. In some embodiments of the powertrain 302, the hydraulically-controlled component 410 may actually be two or more of these components. Furthermore, additional pressure control system options may be created by combining the various MEMS devices discussed with other MEMS devices and metal valves.

Figure 4:
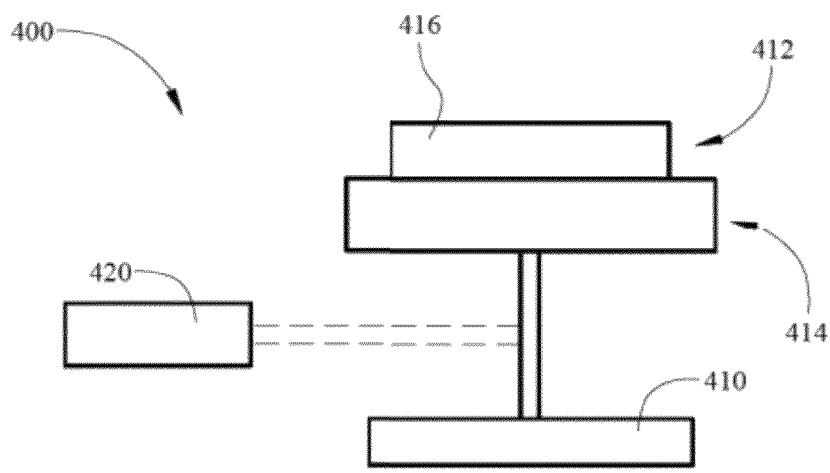
FIG. 4 is a schematic box diagram of a first option for a pressure control system for a hydraulically-controlled component within a transmission.

Referring to FIG. 4 with continuing reference to FIGS. 1 and 3, a first option for a pressure control system for a hydraulically-actuated component 410 is generally indicated at 400. The hydraulically-actuated component 410 may include but is not limited to any of the components of the CVT 306 and the torque converter 320 described above and shown in FIG. 3, including the line pressure control valve 328, the valve devices 330, and the on/off solenoids 340, 342. The first option 400 includes a pilot valve 412 controlling a regulating valve 414. The regulating valve 414 is operably connected to the pilot valve 412 and the hydraulically-actuated component 410. Accordingly, the regulating valve 414 is in fluid communication with the pilot valve 412 and is configured to direct fluid to the hydraulically-actuated component 410 when actuated by the pilot valve 412. The pilot valve 412 includes a first valve 416 producing a pilot signal. The regulating valve 414 is configured to receive the pilot signal and the regulating valve 414 is configured to output a control signal, which controls the hydraulically-actuated component 410.

In the first option 400 shown in FIG. 4, the first valve 416 is the MEMS microvalve 100 shown in FIG. 1, and the regulating valve 414 is the MEMS-based spool valve 200. Therefore, as described herein, the MEMS microvalve 100 produces the pilot signal and communicates through the pilot port 120 to the piloted chamber 220 of the MEMS-based spool valve 200.

In the first option 400 shown in FIG. 4, the first valve 416 may include but is not limited to the MEMS microvalve 100 shown in and described with respect to FIG. 1, and the regulating valve 414 may include but is not limited to the MEMS-based spool valve 200 shown in and described with respect to FIG. 2. Therefore, as described herein, the MEMS microvalve 100 generates the pilot signal and communicates the signal through the pilot port 120 to the piloted chamber 220 of the MEMS-based spool valve 200. The first valve 416 may be directly attached to the hydraulically-actuated component 410, or be remotely located therefrom. For example, the first valve 416 and the regulating valve 414 may be located in the valve body 326.

As shown in FIGS. 1 and 2, when the MEMS microvalve 100 shown in FIG. 1 is combined with the MEMS-based spool valve 200, either by attaching the two directly together or by fluidly connecting the pilot port 120 and piloted chamber 220, the MEMS microvalve 100 acts on the MEMS-based spool valve 200 to alter the fluid flow and pressure to the first load port 228 and the second load port 230.

The inlet port 116 in the MEMS microvalve 100 is relatively small in comparison to the supply port 224 and the first load port 228 of the MEMS-based spool valve 200. In combined operation, the beam 112 of the MEMS microvalve 100 uncovers the inlet port 116, and fluid flows through the inlet port 116, the first chamber 122, and the outlet orifice 124 to the outlet port 118. The inlet port 116 may act as an additional orifice in this flow path.

Due to possible pressure drop through the inlet port 116, it may not be possible to get the pressure in the piloted chamber 220 of the MEMS-based spool valve 200 up to the pressure provided by the high-pressure fluid source. The pressure in the counter chamber 244 may achieve a higher pressure (at or near pump outlet pressure) than may be achieved in the piloted chamber 220, owing to the larger openings of the supply port 224 and the first load port 228 of the MEMS-based spool valve 200, and resultant low pressure drop when fluid flows through these ports. However, because the surface area of the piloted surface 216 is greater than the surface area of the counter surface 222, the slider 212 can still be moved leftward (as viewed in FIG. 2) even if the pressure in the piloted chamber 220 acting on the piloted surface 216 is less than the pressure in the counter chamber 244.

The MEMS-based spool valve 200 has three principal zones or positions of operation: a pressure increase position, a pressure hold position, and a pressure decrease position. The MEMS-based spool valve 200 is shown in FIG. 2 in the pressure hold position, such that the MEMS-based spool valve 200 is holding pressurized fluid on the hydraulically-actuated component 410 (the load).

If the slider 212 is moved rightward (as viewed in FIG. 2), the MEMS-based spool valve 200 is in the pressure decrease position. This is accomplished when the controller 332 commands the MEMS microvalve 100 to close, by increasing electric current supplied to the actuator 114. The first and second ribs 132 and 134 of the actuator 114 expand, causing the beam 112 to pivot counter-clockwise (bending the flexure pivot 126) and cover a larger area of the inlet port 116. Accordingly, flow through the first chamber 122 decreases from the inlet port 116 to the outlet port 118, thus causing the pressure drop across the outlet orifice 124 to decrease as well.

Pressure in the first chamber 122 and in the pilot port 120 decreases in response to the flow decrease through the first chamber 122. Because the pilot port 120 is in direct fluid communication with the piloted chamber 220, this results in an imbalance of the forces acting on the slider 212. The decreased force acting on the piloted surface 216 (due to the lowered pressure in the piloted chamber 220) is now less than the unchanged force acting on the counter surface 222 due to the pressure in the counter chamber 244 (connected to the load).

The force imbalance urges the slider 212 of the MEMS-based spool valve 200 to the right (as viewed in FIG. 2). The web 236 is thus moved rightward, permitting flow of pressurized fluid from the hydraulically-controlled component 410, through the second load port 230 and through the second opening 234 in the slider 212. From there, some of the flow passes directly out of the tank port 226, while some flow may pass up into the trough above the tank port 226, over the top of the web 236, down through the first opening 232, and out the tank port 226. In this manner, pressure is released from the hydraulically-controlled component 410 and vented to the low pressure reservoir connected to the tank port 226.

The slider 212 of the MEMS-based spool valve 200 will move back to the pressure hold position when the pressure in the counter chamber 244 (acting through the first load port 228) is decreased sufficiently to permit the forces acting on the slider 212 to move the slider 212 to the left (as viewed in FIG. 2). With forces equalized, the slider 212 of the MEMS-based spool valve 200 will stop in the pressure hold position. Thus, the pressure at the load (as sensed through the first load port 228 and the second load port 230) will be proportionate to the electrical signal (current) supplied to the actuator 114.

To move the MEMS-based spool valve 200 into the pressure increase position, the controller 332 decreases current flow through the ribs of the actuator 114, and the beam 112 of the MEMS microvalve 100 pivots clockwise to uncover a larger area of the inlet port 116. The uncovering of the larger area of the inlet port 116 results in a pressure increase in the piloted chamber 220, while the pressure in the counter chamber 244 remains constant. The slider 212 is moved leftward (as viewed in FIG. 2) due to the resultant imbalance of forces acting on the slider 212. If the MEMS-based spool valve 200 was in the pressure decrease position, the leftward movement moves the slider valve back to the pressure hold position shown in FIG. 2.

If the controller 332 further decreases current flow and causes the MEMS microvalve 100 to open further, the pressure in the piloted chamber 220 further increases, urging the slider 212 of the MEMS-based spool valve 200 further leftward (as viewed in FIG. 2) into the pressure increase position. Accordingly, the web 242 is moved leftward, permitting flow of pressurized fluid from the supply port 224 through the third opening 238 in the slider 212. From the third opening 238, some of the flow passes directly out of the first load port 228, while some flow may pass up into the trough over the top of the web 242, through the second counter chamber 244, and out of the first load port 228. In this manner, pressure is directed from the source of high-pressure fluid connected to the supply port 224 and applied to the load connected to the first load port 228 (e.g., the hydraulically-operated component 410).

The pilot signal produced by the MEMS microvalve 100 and the control signal produced by the MEMS-based spool valve 200 each have sufficient pressure and flow characteristics to directly control the hydraulically-controlled component 410. The control signal produced by the MEMS-based spool valve 200, however, is capable of generating larger fluid flow, and, therefore, a quicker response time of the hydraulically-controlled component 410. Hence, the selection of the MEMS microvalve 100 versus the MEMS-based spool valve 200 may be dependent on the size and inertia of the hydraulically-controlled component 410.

As also shown in FIG. 4, the first option 400 further includes a MEMS pressure transducer 420. The MEMS pressure transducer 420 is optional. However, when used, the MEMS pressure transducer 420 is configured to sense the pressure profile of the control signal from the regulating valve 414. The controller 332 is configured to receive input from the MEMS pressure transducer 420 and to provide output to the MEMS microvalve 100 in the pilot valve 412 to regulate the system pressure in response to input from the MEMS pressure transducer 420. Therefore, with the MEMS pressure transducer 420 and the controller, the first option 400 may be configured for closed-loop feedback and adjustment of the control signal sent to the hydraulically-controlled component 410.

The hydraulically-controlled component 410 may be any one of the components of the powertrain 302 shown in FIG. 3. For example, and without limitation, the hydraulically-controlled component 410 may be one of: the lock-up clutch 322, the line pressure control valve 328, the valve devices 330, the torque transmitting mechanism 334, and the on/off solenoids 340, 342. In some embodiments of the powertrain 302, the hydraulically-controlled component 410 may actually be two or more of these components.

Figure 5:
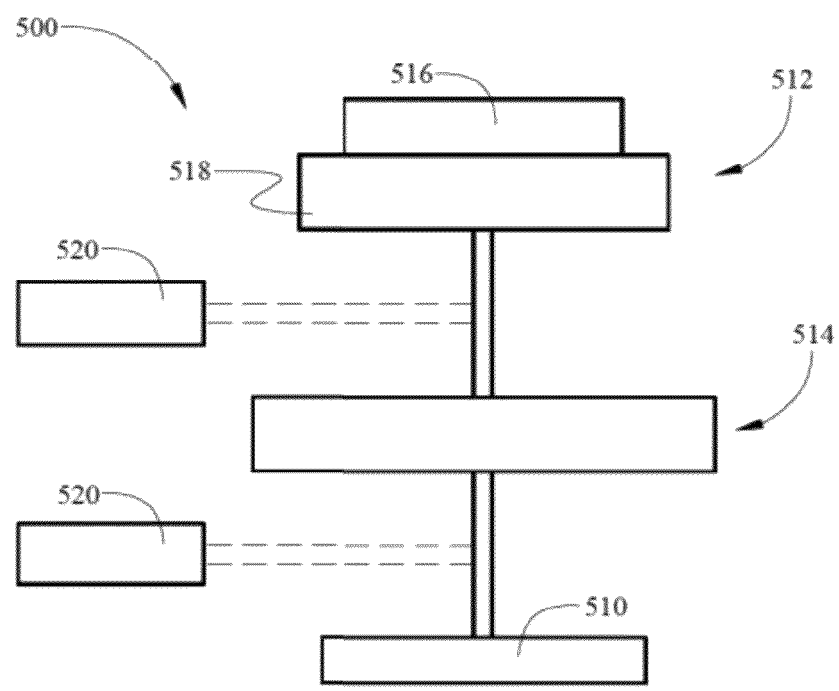
FIG. 5 is a schematic box diagram of a second option for a pressure control system for the hydraulically-controlled component within the CVT.

Referring to FIG. 5 with continuing reference to FIGS. 1-3, a second option for a pressure control system for a hydraulically-actuated component 510 is generally indicated at 500. The hydraulically-actuated component 510 may include but is not limited to any of the components of the CVT 306 described above and shown in FIG. 3, such as the lock-up clutch 322, the line pressure control valve 328, the valve devices 330, the torque transmitting mechanism 334, and the on/off solenoids 340, 342.

The second option 500 includes a pilot valve 512 controlling a regulating valve 514. The regulating valve 514 is operably connected to the pilot valve 512 and the hydraulically-actuated component 510. Accordingly, the regulating valve 514 is in fluid communication with the pilot valve 512 and is configured to direct fluid to the hydraulically-actuated component 510 when actuated by the pilot valve 512. The pilot valve 512 includes a first valve 516 producing a pilot signal. However, unlike the first option 400 shown in FIG. 4, in the second option 500, the pilot valve 512 also includes a second valve 518, which steps up, or amplifies, the pilot signal to an amplified pilot signal. The regulating valve 514 is configured to receive the amplified pilot signal, and is additionally configured to output a control signal, which controls the hydraulically-actuated component 510.

In the second option 500 shown in FIG. 5, the first valve 516 may include but is not limited to the MEMS microvalve 100 shown in and described with respect to FIG. 1, and the second valve 518 may include but is not limited to the MEMS-based spool valve 200 shown in and described with respect to FIG. 2. Therefore, as previously noted, the MEMS microvalve 100 generates the pilot signal and communicates the signal through the pilot port 120 to the piloted chamber 220 of the MEMS-based spool valve 200. However, with the second option 500, the output of the MEMS-based spool valve 200 is the amplified pilot signal, which is then used by the regulating valve 514. The first valve 516 and the second valve 518 may be directly attached to the hydraulically-actuated component 510, or be remotely located therefrom. For example, the first valve 516 and the regulating valve 514 may be located in the valve body 326.

In the second option 500 shown in FIG. 5, the regulating valve 514 is a conventional mechanical regulating valve. Generally, the conventional mechanical regulating valve is a regulating valve produced by mechanical machining processes. Based upon the amplified pilot signal provided by the pilot valve 512, the conventional mechanical regulating valve provides the control signal for the hydraulically-actuated component 510.

The amplified pilot signal produced by the pilot valve 512, including both the first valve 516 and the second valve 518 (the MEMS-based spool valve 200), has sufficient pressure and flow characteristics to control the conventional mechanical regulating valve 514. As controlled by the amplified signal, the conventional mechanical regulating valve 514 may in turn control the hydraulically-controlled component 510. However, the pressure and flow characteristics of the pilot signal produced solely by the first valve 516 (the MEMS microvalve 100) of the pilot valve 512 may be insufficient to actuate the hydraulically-controlled component 510 at a desired rate. Accordingly, the conventional mechanical regulating valve may further increase the pressure and flow characteristics used to control the hydraulically-controlled component 510, as compared with the first option 400 shown in FIG. 4.

Similar to the first option shown in FIG. 4, the second option 500 further includes optional MEMS pressure transducers 520. Although two pressure transducers 520 are shown in FIG. 5, any number of MEMS pressure transducers 520 is optional. However, when used, the MEMS pressure transducers 520 are configured to sense the pressure profile of the amplified pilot signal from the pilot valve 512 or of the control signal from the regulating valve 514. In most configurations, only one of the MEMS pressure transducers 520 will be used. If used to sense the pressure profile of the pilot signal, the MEMS pressure transducer 520 may be combined into a single package along with the MEMS microvalve 100 and the MEMS-based spool valve 200 for the pilot valve 512.

The controller 332 is configured to receive input from one of the MEMS pressure transducers 520 and to provide output to the MEMS microvalve 100 in the pilot valve 512 to regulate the system pressure in response to input from one of the MEMS pressure transducers 520. Therefore, the MEMS pressure transducers 520 are used to provide closed-loop feedback and adjustment of the control signal sent to the hydraulically-controlled component 510.

The hydraulically-controlled component 510 may be any one of the components of the powertrain 302 shown in FIG. 3. For example, and without limitation, the hydraulically-controlled component 510 may be one of: the lock-up clutch 322, the line pressure control valve 328, the valve devices 330, the torque transmitting mechanism 334, and the on/off solenoids 340, 342. In some embodiments of the powertrain 302, the hydraulically-controlled component 510 may actually be two or more of these components. Each of the first option 400 and the second option 500 may be used with any of the components of the powertrain 302.

Figure 6:
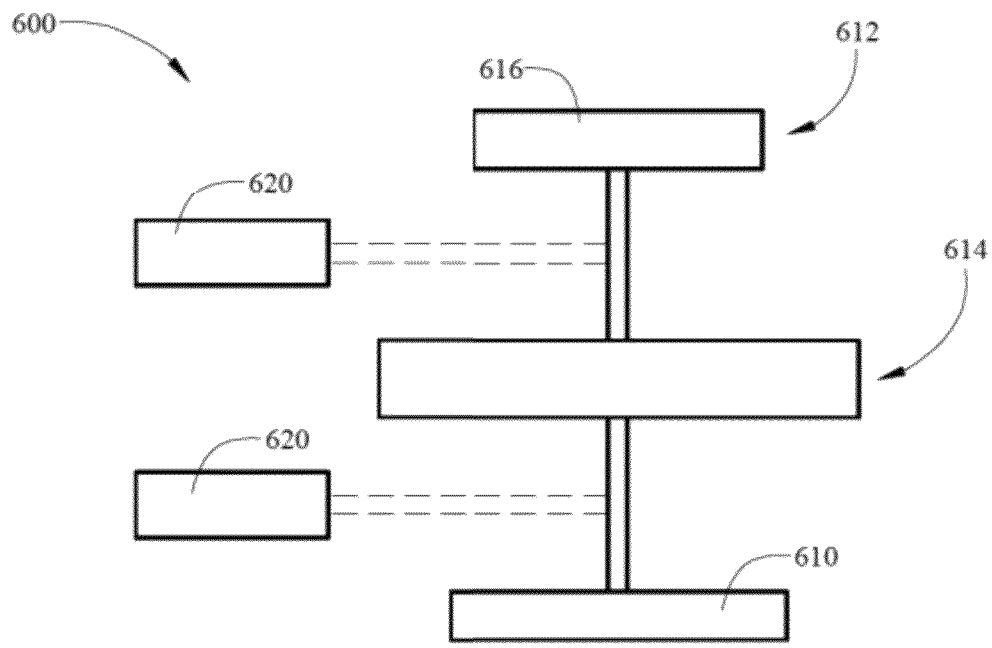
FIG. 6 is a schematic box diagram of a third option for a pressure control system for a third hydraulically-controlled component within the CVT.

Referring to FIG. 6 with continuing reference to FIGS. 1-3, a third option for a pressure control system for a hydraulically-actuated component 610 is generally indicated at 600. The hydraulically-actuated component 610 may include but is not limited to any of the components of the CVT 306 described above and shown in FIG. 3, including the lock-up clutch 322, the line pressure control valve 328, the valve devices 330, the torque transmitting mechanism 334, and the on/off solenoids 340, 342.

The third option 600 includes a pilot valve 612 controlling a regulating valve 614. The regulating valve 614 is operably connected to the pilot valve 612 and the hydraulically-actuated component 610. Accordingly, the regulating valve 614 is in fluid communication with the pilot valve 612 and is configured to direct fluid to the hydraulically-actuated component 610 when actuated by the pilot valve 612. The pilot valve 612 includes a first valve 616 producing a pilot signal. The regulating valve 614 is configured to receive the pilot signal, and is additionally configured to output a control signal, which controls the hydraulically-actuated component 610.

In the third option 600 shown in FIG. 6, the first valve 616 may include but is not limited to the MEMS microvalve 100 shown in and described with respect to FIG. 1, however, there is no second valve forming the pilot valve 612. Therefore, unlike the first option 400 shown in FIG. 4 and in the second option 500 shown in FIG. 5, the MEMS microvalve 100 communicates the pilot signal directly to the regulating valve 614, which is a small mechanical spool valve. The first valve 616 may be directly attached to the hydraulically-actuated component 610, or be remotely located therefrom. For example, the first valve 616 and the regulating valve 614 may be located in the valve body 326.

Generally, the small mechanical spool valve is a regulating valve produced by mechanical machining processes, but on a smaller scale than the conventional mechanical regulating valve. Based upon the (un-amplified) pilot signal provided by the pilot valve 612, the small mechanical spool valve generates the control signal for the hydraulic-actuated component 610. Compared to the conventional mechanical regulating valve used in the second option 500 shown in FIG. 5, the small mechanical spool valve is, for example, on the order of half the size of a conventional mechanical regulating valve.

The pilot signal produced by the pilot valve 612 (including only the MEMS microvalve 100) has sufficient pressure and flow characteristics to directly control the small mechanical spool valve used for the regulating valve 614. However, the pressure and flow characteristics of the pilot signal produced solely by the pilot valve 612 may be insufficient to directly control at a desired rate the conventional mechanical regulating valve used in the second option 500. Accordingly, the small mechanical spool valve may then control the hydraulically-controlled component 610.

The third option 600 may further include one or more MEMS pressure transducers 620. The MEMS pressure transducers 620 are again optional. However, when used, the MEMS pressure transducers 620 are configured to sense the pressure profile of the pilot signal from the pilot valve 612 or of the control signal from the regulating valve 614. In most configurations, only one MEMS pressure transducer 620 will be used. If used to sense the pressure profile of the pilot signal, the MEMS pressure transducer 620 may be combined into a single package along with the MEMS microvalve 100 for the pilot valve 612.

The controller 332 is configured to receive input from one of the MEMS pressure transducers 620 and to provide output to the MEMS microvalve 100 in the pilot valve 612 to regulate the system pressure in response to input from one of the MEMS pressure transducers 620. Therefore, the MEMS pressure transducers 620 are used to provide closed-loop feedback and adjustment of the control signal sent to the hydraulically-controlled component 610.

The hydraulically-controlled component 610 may be any one of the components of the powertrain 302 shown in FIG. 3. For example, and without limitation, the hydraulically-controlled component 610 may be one of: the lock-up clutch 322, the line pressure control valve 328, the valve devices 330, the torque transmitting mechanism 334, and the on/off solenoids 340, 342. In some embodiments of the powertrain 302, the hydraulically-controlled component 610 may actually be two or more of these components. Each of the first option 400, the second option 500, and the third option 600 may be used with any of the components of the powertrain 302.

Figure 7:
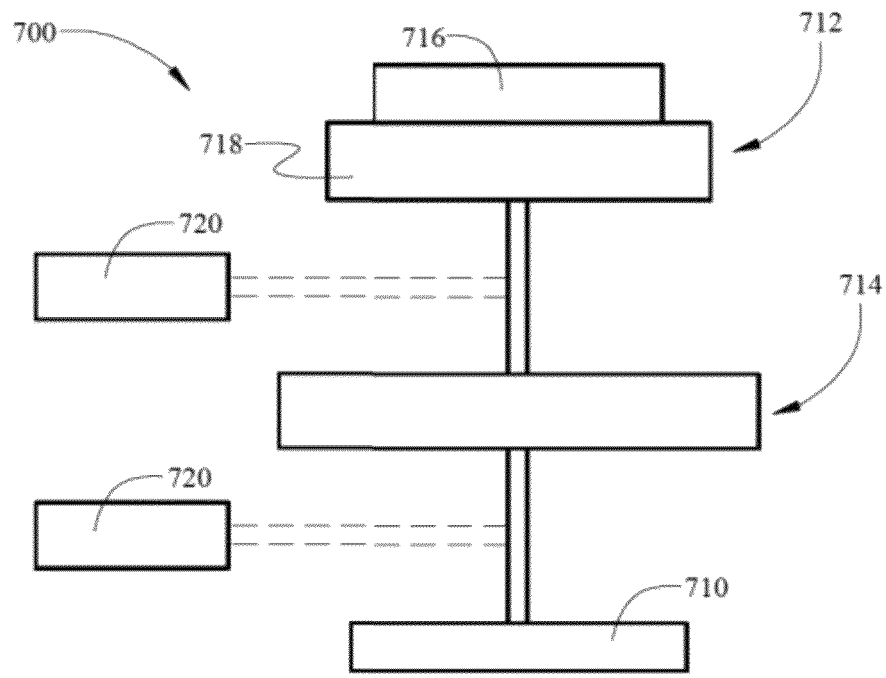
FIG. 7 is a schematic box diagram of a fourth option for a pressure control system for a fourth hydraulically-controlled component within the CVT.

Referring to FIG. 7 with continuing reference to FIGS. 1-3, a fourth option for a pressure control system for a hydraulically-actuated component 710 is generally indicated at 700. Specifically, the hydraulically-controlled component 710 may include but is not limited to the lock-up clutch 322, the line pressure control valve 328, the valve devices 330, the torque transmitting mechanism 334, and the on/off solenoids 340, 342, shown in FIG. 3.

The fourth option 700 includes a pilot valve 712 controlling a regulating valve 714. The regulating valve 714 is operably connected to the pilot valve 712 and the hydraulically-actuated component 710. Accordingly, the regulating valve 714 is in fluid communication with the pilot valve 712 and is configured to direct fluid to the hydraulically-actuated component 710 when actuated by the pilot valve 712. Similar to the second option 500 shown in and described with respect to FIG. 5, the pilot valve 712 additionally includes a second valve 718, which steps up, or amplifies, the pilot signal to an amplified pilot signal. The regulating valve 714 is again configured to receive the amplified pilot signal, and additionally to output a control signal, which controls the hydraulically-actuated component 710 when actuated by the pilot valve 712.

The pilot valve 712 includes a first valve 716 producing a pilot signal. Similar to the second option 500 shown in FIG. 5, the pilot valve 712 also includes a second valve 718, which steps up, or amplifies, the pilot signal to an amplified pilot signal. The regulating valve 714 is again configured to receive the amplified pilot signal and the regulating valve 714 is configured to output a control signal, which controls the hydraulically-actuated component 710.

In the fourth option 700 shown in FIG. 7, the first valve 716 is the MEMS microvalve 100 shown in FIG. 1, and the second valve 718 may include but is not limited to a small mechanical spool valve, as described above with respect to the third option shown in FIG. 6. As noted above, based upon the (un-amplified) pilot signal provided by the pilot valve 712, the small mechanical spool valve generates the control signal for the regulating valve 714. The regulating valve 714 is again a conventional mechanical regulating valve. Based upon the amplified pilot signal provided by the pilot valve 712, which includes both the MEMS microvalve 100 and the small mechanical spool valve, the conventional mechanical regulating valve provides the control signal for the hydraulically-actuated component 710.

Accordingly, as already described herein, the MEMS microvalve 100 selectively produces the pilot signal and communicates this signal through the pilot port 120 to the small mechanical spool valve. However, with the fourth option 700, the output of the small mechanical spool valve is the amplified pilot signal, which is then used by the regulating valve 714. In the fourth option 700, the small mechanical spool valve functions similarly to the MEMS-based spool valve 200 used as the second valve 518 in the second option 500 shown in FIG. 5. However, the small mechanical spool valve used as the second valve 718 for the fourth option 700 may be at least 100 times larger than the MEMS-based spool valve 200 used for the second valve 518 in the second option 500.

The amplified pilot signal produced by the pilot valve 712 (including both the first valve 716 and the second valve 718) has sufficient pressure and flow characteristics to directly control the conventional mechanical regulating valve, which may then control the hydraulically-controlled component 710. However, the pressure and flow characteristics of the pilot signal produced solely by the first valve 716 (the MEMS microvalve 100) may be insufficient to directly pilot the conventional mechanical regulating valve or to directly control the hydraulically-controlled component 710 at a desired rate. Accordingly, the conventional mechanical regulating valve may further increase the pressure and flow characteristics used to control the hydraulically-controlled component 710.

The fourth option 700 may further include one or more MEMS pressure transducers 720. The MEMS pressure transducers 720 are again optional. However, when used, the MEMS pressure transducers 720 are configured to sense the pressure profile of pilot signal from the pilot valve 712 or of the control signal from the regulating valve 714. In most configurations, only one of the MEMS pressure transducers 720 will be used.

The controller 332 is configured to receive input from one of the MEMS pressure transducers 720 and to provide output to the MEMS microvalve 100 in the pilot valve 712 to regulate the system pressure in response to input from one of the MEMS pressure transducers 720. Therefore, the MEMS pressure transducers 720 are used to provide closed-loop feedback and adjustment of the control signal sent to the hydraulically-controlled component 710.

The hydraulically-controlled component 710 may be any one of the components of the powertrain 302 shown in FIG. 3. For example, and without limitation, the hydraulically-controlled component 710 may be one of: the lock-up clutch 322, the line pressure control valve 328, the valve devices 330, the torque transmitting mechanism 334, and the on/off solenoids 340, 342. In some embodiments of the powertrain 302, the hydraulically-controlled component 710 may actually be two or more of these components. Each of the first option 400, the second option 500, the third option 600, and the fourth option 700 may be used with any of the components of the powertrain 302.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A continuously variable transmission (CVT) for a vehicle, the transmission comprising:
 a hydraulically-controlled component;
 a pilot valve including a micro-electrical-mechanical-systems (MEMS) first valve portion and a second valve portion, wherein the first valve portion produces a pilot signal having sufficient pressure and flow to directly control the second valve portion, the second valve portion includes a mechanical non-MEMS spool valve that is at least 100 times larger than the MEMS first valve portion, the second valve portion amplifies the pilot signal to an amplified pilot signal, and the pilot valve is operably connected to and configured for actuating the hydraulically-controlled component; and
 a regulating valve operably connected to the pilot valve and the hydraulically-controlled component and configured to receive the amplified pilot signal and output a control signal to control the hydraulically-controlled component.

2. A CVT as set forth in claim 1, wherein the MEMS first valve portion of the pilot valve includes a MEMS pressure differential actuator valve.

3. A CVT as set forth in claim 2, wherein the pilot valve further includes a MEMS regulating valve.

4. A CVT as set forth in claim 1, wherein the regulating valve includes a MEMS device.

5. A CVT as set forth in claim 4, wherein the MEMS-based device of the pilot valve includes a MEMS pressure differential actuator valve.

6. A CVT as set forth in claim 4, wherein the MEMS device of the regulating valve includes a MEMS regulating valve.

7. A CVT as set forth in claim 1, wherein the regulating valve includes a spool valve.

8. A CVT as set forth in claim 1, further comprising a valve body, wherein the hydraulically-controlled component includes at least one of a line pressure control valve disposed within the valve body, a valve device disposed within the valve body, a torque transmitting mechanism, and an on/off solenoid.

9. A CVT as set forth in claim 1, further comprising a torque converter, wherein the hydraulically-controlled component includes a lock-up clutch operatively connected to the torque converter, wherein the lock-up clutch is configured for locking the torque converter.

10. A CVT as set forth in claim 1, further comprising a pressure sensor operably disposed between the pilot valve and the hydraulically-controlled component.

11. A CVT as set forth in claim 10, wherein the pressure sensor is operably disposed between the regulating valve and the hydraulically-controlled component.

12. A CVT as set forth in claim 10, wherein the pressure sensor includes a MEMS pressure transducer.

13. A vehicle comprising:
an engine configured for producing a torque;
a continuously variable transmission (CVT) coupled to the engine and configured for receiving the torque from the engine, wherein the CVT includes:
  a hydraulically-controlled component;
  a pilot valve including a micro-electrical-mechanical-systems (MEMS) first valve portion and a second valve portion, wherein the first valve portion produces a pilot signal having sufficient pressure and flow to directly control the second valve portion, the second valve portion includes a mechanical non-MEMS spool valve that is at least 100 times larger than the MEMS first valve portion, the second valve portion amplifies the pilot signal to an amplified pilot signal, and the pilot valve is operably connected to and configured for actuating the hydraulically-controlled component; and
  a regulating valve operably connected to the pilot valve and the hydraulically-controlled component and configured to receive the amplified pilot signal and output a control signal to control the hydraulically-controlled component.

14. A vehicle as set forth in claim 13, wherein the MEMS first valve portion of the pilot valve includes a MEMS pressure differential actuator valve.

15. A vehicle as set forth in claim 14, wherein the pilot valve further includes a MEMS regulating valve.

16. A vehicle as set forth in claim 15, wherein the regulating valve includes a MEMS device.

17. A vehicle as set forth in claim 16, wherein the MEMS device of the pilot valve includes a MEMS pressure differential actuator valve, and wherein the MEMS device of the regulating valve includes a MEMS regulating valve.

18. A vehicle as set forth in claim 13, wherein the regulating valve includes a spool valve.

19. A vehicle as set forth in claim 13, wherein the CVT additionally includes a valve body and a torque converter, and wherein the hydraulically-controlled component includes at least one of a line pressure control valve disposed within the valve body, a valve device disposed within the valve body, a torque transmitting mechanism, an on/off solenoid, and a lock-up clutch operatively connected to the torque converter and configured for generating a mechanical connection between the engine and the CVT.

* * * * *